United States Patent
Bishop

(10) Patent No.: US 8,514,916 B2
(45) Date of Patent: Aug. 20, 2013

(54) CONNECTING CABLE LENGTH DETECTOR

(75) Inventor: Donald M. Bishop, Highlands Ranch, CO (US)

(73) Assignee: ViaSat, Inc., Carlsbad, CA (US)

(*) Notice: Subject to any disclaimer, the term of this patent is extended or adjusted under 35 U.S.C. 154(b) by 1108 days.

(21) Appl. No.: 12/480,531

(22) Filed: Jun. 8, 2009

(65) Prior Publication Data

US 2009/0304059 A1    Dec. 10, 2009

Related U.S. Application Data

(60) Provisional application No. 61/059,392, filed on Jun. 6, 2008.

(51) Int. Cl.
*H04B 1/38* (2006.01)

(52) U.S. Cl.
USPC .......... 375/222; 340/12.37; 340/538.15; 342/352; 455/557; 725/111

(58) Field of Classification Search
None
See application file for complete search history.

(56) References Cited

U.S. PATENT DOCUMENTS

| | | | | |
|---|---|---|---|---|
| 5,444,695 A | * | 8/1995 | Copley et al. | 370/452 |
| 8,179,144 B1 | * | 5/2012 | Lo et al. | 324/533 |
| 2002/0154688 A1 | * | 10/2002 | Pollmann et al. | 375/229 |
| 2011/0154428 A1 | * | 6/2011 | Keady et al. | 725/127 |

* cited by examiner

*Primary Examiner* — Adolf Dsouza
(74) *Attorney, Agent, or Firm* — Holland & Hart LLP

(57) ABSTRACT

Disclosed are embodiments for determining the length of a connecting cable between a modem and a transceiver by measuring the propagation time of a signal along the connecting cable. A cable length signal is used to adjust the gain of the modem, that ensures that the transceiver circuit operates in the correct power range for both transmitting and receiving signals.

8 Claims, 4 Drawing Sheets

CONNECTING CABLE LENGTH DETECTOR

CROSS-REFERENCE TO RELATED APPLICATION

This application claims benefit of and priority to U.S. Provisional Patent Application Ser. No. 61/059,392, entitled "Connecting Cable Length Detector," by Donald M. Bishop, filed Jun. 6, 2008, the entire contents of which are specifically incorporated herein by reference for all that it discloses and teaches.

BACKGROUND OF THE INVENTION

In certain satellite communication systems, there exists a need to separate the transceiver subsystem from its associated modulator subsystems by some distance. This can have many advantages, especially in applications where the modulator can be placed in an indoor, benign environment, leaving only the final heterodyne stage high power amplifier and antenna system in an outdoor environment. This configuration is the preferred configuration for satellite broadband operators with modems that transmit to and from satellites.

SUMMARY OF THE INVENTION

An embodiment of the present invention may therefore comprise a method of automatically adjusting the gain of a modem that is connected to a transceiver by a connecting cable in a satellite communication system comprising: detecting a control signal that enables a tone generator that generates a tone control signal in response to the control signal; transmitting the tone control signal to the transceiver; activating a counter in response to the control signal; applying a voltage from a power supply to the connecting cable to power the transceiver; sampling a count value from the counter upon detection of an increase in current supplied to the transceiver from the power supply; generating a cable length signal from the count value; applying the cable length signal to a gain control circuit; adjusting gain of a modem in response to the cable length signal.

An embodiment of the present invention may further comprise a system for automatically adjusting the gain of a modem in a satellite communication system comprising: a transceiver; a connecting cable that is connected between the transceiver and the modem that supplies power to the transceiver from the modem; the modem comprising: a tone generator that generates a tone control signal that is transmitted to the transceiver through the connecting cable in response to a control signal; a counter that is activated in response to the control signal that generates a counter value signal; a power source that is connected to the connecting cable and that supplies the power to the transceiver; a detector that detects an increase in current supplied by the power source to the high powered transmitter and generates a sample signal upon detection of the increase in the current supplied by the power source to the high powered transmitter; a counter value signal generated in response to the sample signal that is indicative of attenuation of the connecting cable; a gain control circuit that adjusts gain of the modem in response to the counter value signal.

DETAILED DESCRIPTION OF THE EMBODIMENTS

Figure 1:
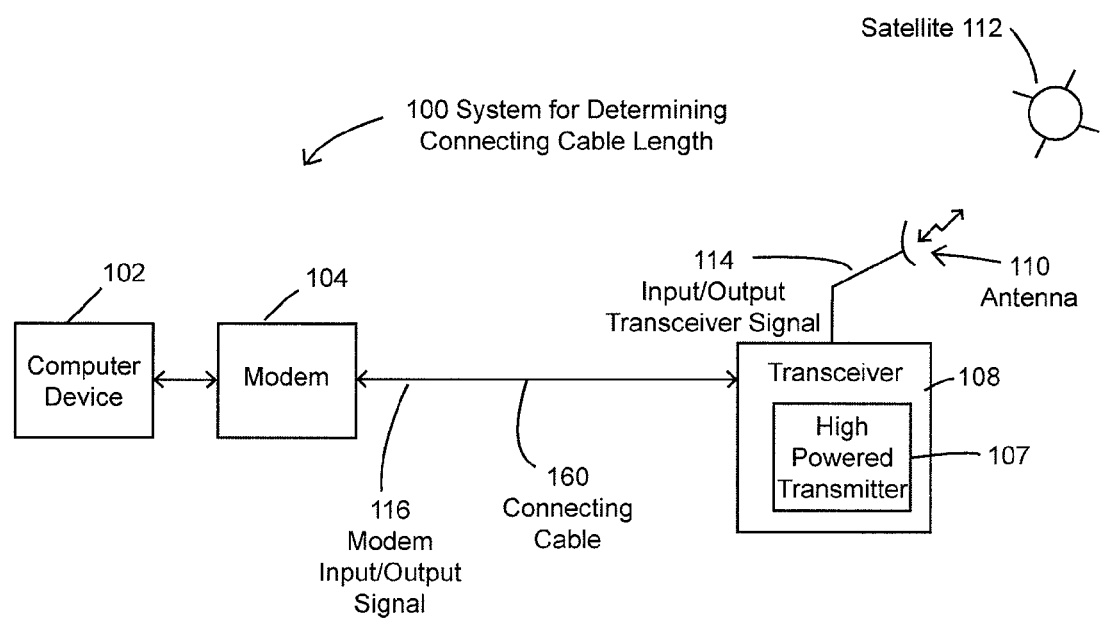
FIG. 1 is a schematic block diagram of a system for determining cable length that may employ one of the disclosed embodiments.

FIG. 1 is a schematic block diagram of one embodiment of a system 100 for determining the length of a connecting cable 106. As shown in FIG. 1, a computer device 102, such as a personal computer, is connected to a modem 104. Computer device 102 and modem 104 may be disposed in a controlled environment, such as in an office or home. A connecting cable 106 is used to connect the modem 104 to a transceiver 108 that is disposed at some distance from the computer device 102 and modem 104. For example, the computer device 102 and modem 104 may be disposed within an office or a home, while transceiver 108 and antenna 110 may be disposed outside. Modem 104 modulates/demodulates the information transmitted/received to and from computer device 102. Modem 104 applies signals to the transceiver 108 that have a power level that ensures that the transceiver 108 operates in a designed operating range and is not damaged as a result of overdriving the transceiver 108. Because of the attenuation of the connecting cable 106, the gain requirements of the modem vary widely, depending upon the length of the connecting cable 106. For example, the cable may have an attenuation of 0-20 db or 30 db, depending upon the length of the cable. Hence, the modem 104 must generate an output signal that is applied to the transceiver that varies over a wide range, 0-30 db. The input/output transceiver signal 114 sends and receives signals using antenna 110. Signals are transmitted and received wirelessly between antenna 110 and satellite 112.

In order to prevent the transceiver 108 from either being underdriven or overdriven, it is beneficial to know the length of the connecting cable 106, so that the proper gain can be generated by the modem 104 to produce a modem input/output signal having the correct amplitude. For example, if the installed connecting cable 106 is shorter than the length reported by the technician installing the system 100, the transceiver 108 can be overdriven and severely damaged. If the transceiver 108 is overdriven and damaged, the transceiver 108 must be replaced at the cost of many hundreds or even thousands of dollars. Further, overdriving the transceiver 108 will increase the amplitude of the harmonic frequencies of the output signal 114 which may violate FCC regulations. If the connecting cable 106 is longer than the length reported by the installing technician, the modem will generate an input/output signal 116 that will cause the transceiver 108 to be underdriven, and transmissions to and from satellite 112 will not be properly transmitted or received. By knowing the actual length of the connecting cable 106, the modem 104 can be adjusted to provide the proper gain for the input/output signal 116 that is applied to the transceiver 108 to prevent damage to the transceiver 108, since attenuation is substantially proportional to the length of the cable and the amount of attenuation per length does not vary substantially for different types of cable.

As shown in FIG. 1, the modem 104 transmits the modem output signal 116 through, and receives the modem input signal 116 from, connecting cable 106. Modem 104 also provides power for operating transceiver 108. In other words, the connecting cable 106 connects a DC power source 308 (FIG. 3) in modem 104 to the transceiver 108. This avoids the problems of providing power for the transceiver 108 at an outdoor location that may be inconvenient, such as on a roof.

In operation, a DC voltage is applied to the transceiver 108 through the connecting cable 106 to operate transceiver 108. When a 10 MHz tone signal, or other tone control signal, is generated by the modem 104, the connecting cable 106 transmits the 10 MHz tone control signal 202 (FIG. 2A) to the transceiver 108 via connecting cable 106. The transceiver 108 detects the 10 MHz tone control signal 202 (FIG. 2A) and, in response, turns-on high powered transmitter 107 utilizing the DC power supplied from the connecting cable 106. When the high powered transmitter 107 is activated by the 10 MHz tone control signal 202 (FIG. 2A), a larger amount of current will be drawn through the connecting cable 106 from the power supply 308 (FIG. 3), located in the modem 104, to operate the high powered transmitter 107 in the transceiver 108. In other words, a DC voltage is applied to the connecting cable 106 from the power supply 308 (FIG. 3) in the modem 104. The high powered transmitter 107 in the transceiver 108 uses the DC voltage on the connecting cable 106 to operate. In order to operate the high powered transmitter 107, a large amount of power is required. Hence, the current draw 204 (FIG. 2B) through the connecting cable 106 increases substantially when the high powered transmitter 107 begins to operate in response to the 10 MHz tone control signal 202. The 10 MHz tone control signal 202 and the DC power signal 204 are more fully illustrated in FIGS. 2A and 2B.

Figure 2A:
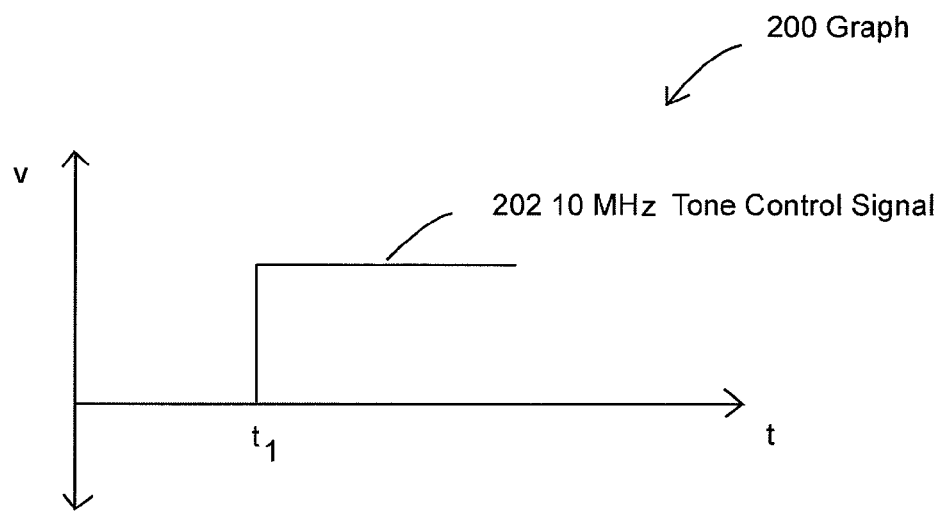
FIG. 2 is a graph showing the time delay between a ten megahertz control signal and a DC power signal that are transmitted over the connecting cable.

FIG. 2A is a graph 200 illustrating a voltage versus time plot of the 10 MHz tone control signal 202. As shown in FIG. 2A, at a certain time ($t_1$), a 10 MHz tone control signal 202 is generated by the modem 104 (FIG. 1). This occurs when the modem instructs transceiver 108 to begin operation. As indicated above, the 10 MHz tone control signal 202 is transmitted through the connecting cable 106 to the transceiver 108.

Figure 2B:
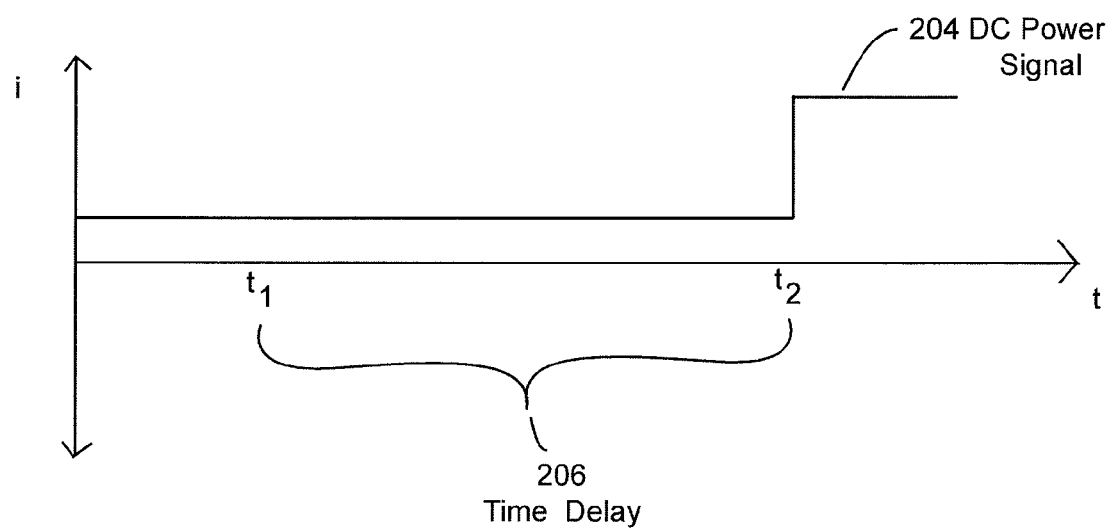

FIG. 2B is a graph of the current versus time plot of the DC power signal 204. As shown in FIG. 2B, the current level of the DC power signal 204 is low until time $t_1$, when the transmitter and the transceiver 108 begin to draw current. From t=0 to $t_2$, the DC power signal 204 drives other components in the transceiver 108. A smaller amount of current is drawn through connecting cable 106 to operate other components, as illustrated in FIG. 2B. When the high powered transmitter 107 begins to transmit, a large amount of current is drawn through the connecting cable 106, which is shown in FIG. 2B as an increase in the current level of the DC power signal 204 at time $t_2$. The input impedance of the high powered transmitter 107 drops substantially when the high powered transmitter 107 begins to transmit. Assuming the power supply in the modem 104 maintains the DC voltage level that is applied to the transceiver, the current applied to the high powered transmitter through the connecting cable 106 increases proportionally.

The time delay between $t_1$ and $t_2$ indicates the propagation time of the 10 MHz tone control signal 202 along the length of the connecting cable 106, plus other time delays that relate to circuit operation. Hence, the amount of the time delay 206 is indicative of the length of the connecting cable 106. Measurement of the time delay 206 can provide information relating to the length of the connecting cable 106.

Figure 3:
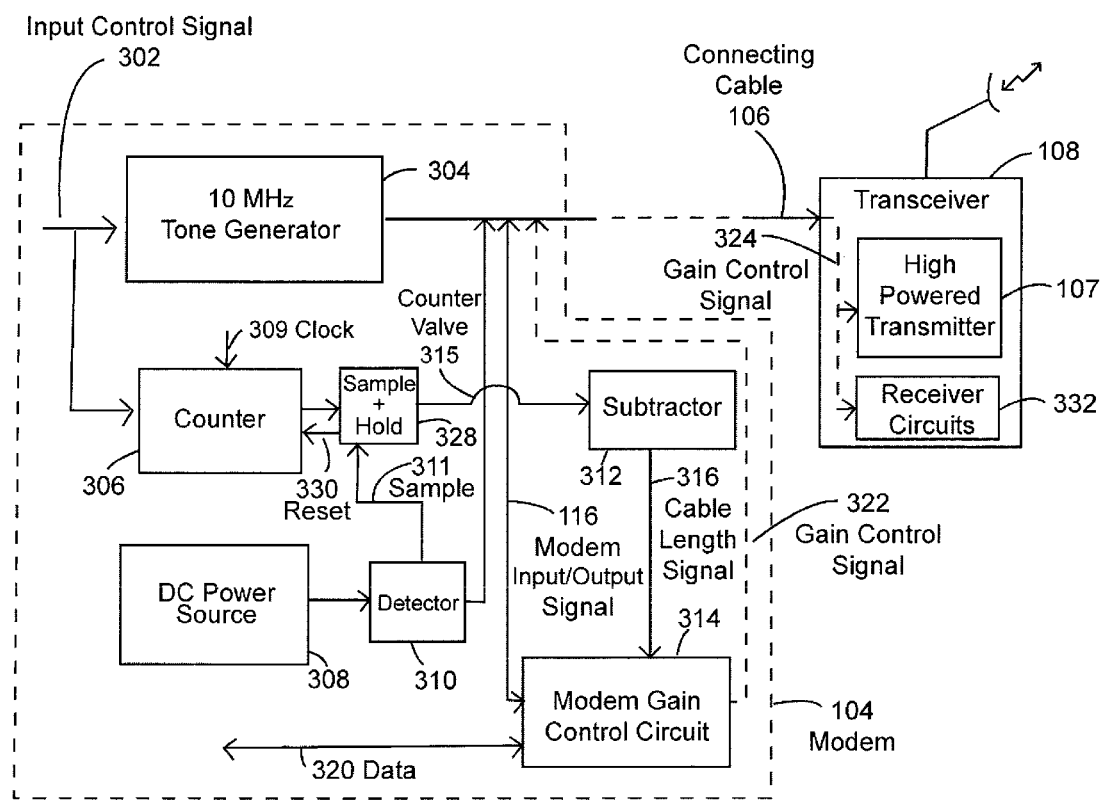
FIG. 3 is a schematic block diagram illustrating one embodiment for implementing a system for determining connecting cable length.

FIG. 3 is a schematic block diagram of one embodiment for determining the length of the connecting cable 106. As shown in FIG. 3, modem 104 includes 10 MHz tone generator 304, a counter 306, a sample and hold circuit 328, a DC power source 308, a detector 310, a subtractor circuit 312, and a modem gain control circuit 314. Modem 104 is coupled to the transceiver 108 via connecting cable 106, as disclosed above. The input control signal 302 is connected to the 10 MHz tone generator 304, which generates the 10 MHz tone control signal 202 that is applied to the connecting cable 106 when data is to be transmitted from the modem 104 to the transceiver 108. The input control signal 302 is also applied to a counter 306. A clock signal 309 is also applied to counter 306. Upon detection of the input control signal 302, the counter begins counting the clock pulses from clock signal 309. DC power source 308 applies a DC voltage to the connecting cable 106 via detector 310. The DC voltage that is applied to the connecting cable 106 is used to power the transceiver 108, as set forth above.

In operation, when a data signal is to be transmitted from the transceiver 108 to the satellite 112, input control signal 302 is applied to the 10 MHz tone generator 304, which generates a 10 MHz tone control signal 202 on the connecting cable 106. In response to the 10 MHz tone control signal 202, the transceiver 108 turns-on the high powered transmitter 107 to transmit the data to the satellite 112. The input control signal 302 is simultaneously applied to the counter 306, which begins counting the clock pulses 308. When the transceiver 108 receives the 10 MHz tone control signal 202, the transceiver 108 turns-on the high powered transmitter 107 in the transceiver 108, which causes a higher current to be drawn over the connecting cable 106 from the DC power source 308. The detector 310 detects the initiation of the higher current draw from the DC power source 308, and generates a sample signal 311. The sample signal 311 is applied to the sample and hold circuit to sample the value of the counter 306. After the count value 315 of the counter 306 has been sampled by the sample and hold circuit 328, sample and hold circuit 328 generates a reset signal 330 to reset counter 306. Counter 306 can comprise a high speed counter or a series of inverter circuits that propagate a signal by a known delay. By counting the number of inverter circuits through which the signal has propagated, an accurate value can be determined for time delay 206. Detector 310 can comprise a small series connected resistor and a voltage detector that detects a voltage increase across the series connected resistor.

Alternatively, control signals generated by DC power source can be utilized to detect the increase in the power level. The output counter value 315 of the counter 310 is applied to the subtractor circuit 312. Subtractor circuit 312 subtracts a constant value from the counter value 315, which is approximately equal to certain delays that are created by the circuitry of the modem 104. The cable length signal 316, generated by the subtractor circuit 312, has a value that is substantially proportional to the length of the connecting cable 106. The cable length signal 316 is applied to modem gain control circuit 314 that modifies the gain of the modem input/output signal 316. Data signal 320 is applied to the modem gain control circuit 314, which modifies the gain of the data signal to generate the modem output signal 316 that is transmitted across the connecting cable 106 to the transceiver 108. The transceiver 108, as disclosed above, includes a high powered transmitter 107 that has a specified amount of gain, such as, for example, 50 db gain. To protect the high powered transmitter 107 from generating an output signal that is too high, and which would damage the high powered output transmitter 107, the output signal 116 from the modem gain control circuit 314 must not exceed a certain level. In a similar manner, modem input signals 116 that are transmitted by the transceiver 108 across the connecting cable 106 are amplified by the modem gain control circuit 314 to produce a data output signal 320. The modem gain control circuit 314 must apply the proper amount of gain so that the data signal 320 from the modem gain control circuit 314 has the proper amplitude to operate with other circuitry in the modem 104. In this fashion, the modem gain control circuit 314 provides the proper gain for the data signal 320.

In addition, an optional gain control signal 322 can be generated to control the gain of the transceiver 108. The modem gain control circuit 314 generates a gain control signal 322 that is applied to the connecting cable 106. The gain control signal 322 is transmitted to the transceiver 108 and controls both the gain of the high powered transmitter 107, as well as the gain of the receiver circuits 332 in the transceiver 108. In this manner, the proper operational transmission and receiver levels are utilized by the transceiver 108 and damage to the transceiver 108, and other adverse effects resulting from improper operational levels, are avoided.

The automatic nature of the manner in which the gain of the modem gain control circuit 314 is adjusted is a substantial improvement over current manual processes of adjusting the gain. Current processes require the installer to measure the cable length and manually insert that length into the system. With that information, the gain of the modem 104 is automatically adjusted. Typically, installers will not take the time and effort to measure the cable, and will either guess at the length of the cable, or just enter any number that meets the guidelines for the installation length of the cable. The disclosed embodiments eliminate these types of problems by automatically adjusting the gain of the modem 104 by measuring the propagation time of the 10 MHz tone control signal or other control signal that is used to operate the transceiver 108. Optionally, in addition, the gain of both the high powered transmitter 107 and the receiver circuits 332 and the transceiver 108 can be adjusted by the modem gain control circuit, based upon the cable length signal 316. This optional method of controlling the gain of the transceiver 108 provides additional control over the circuitry in the transceiver 108.

Figure 4:
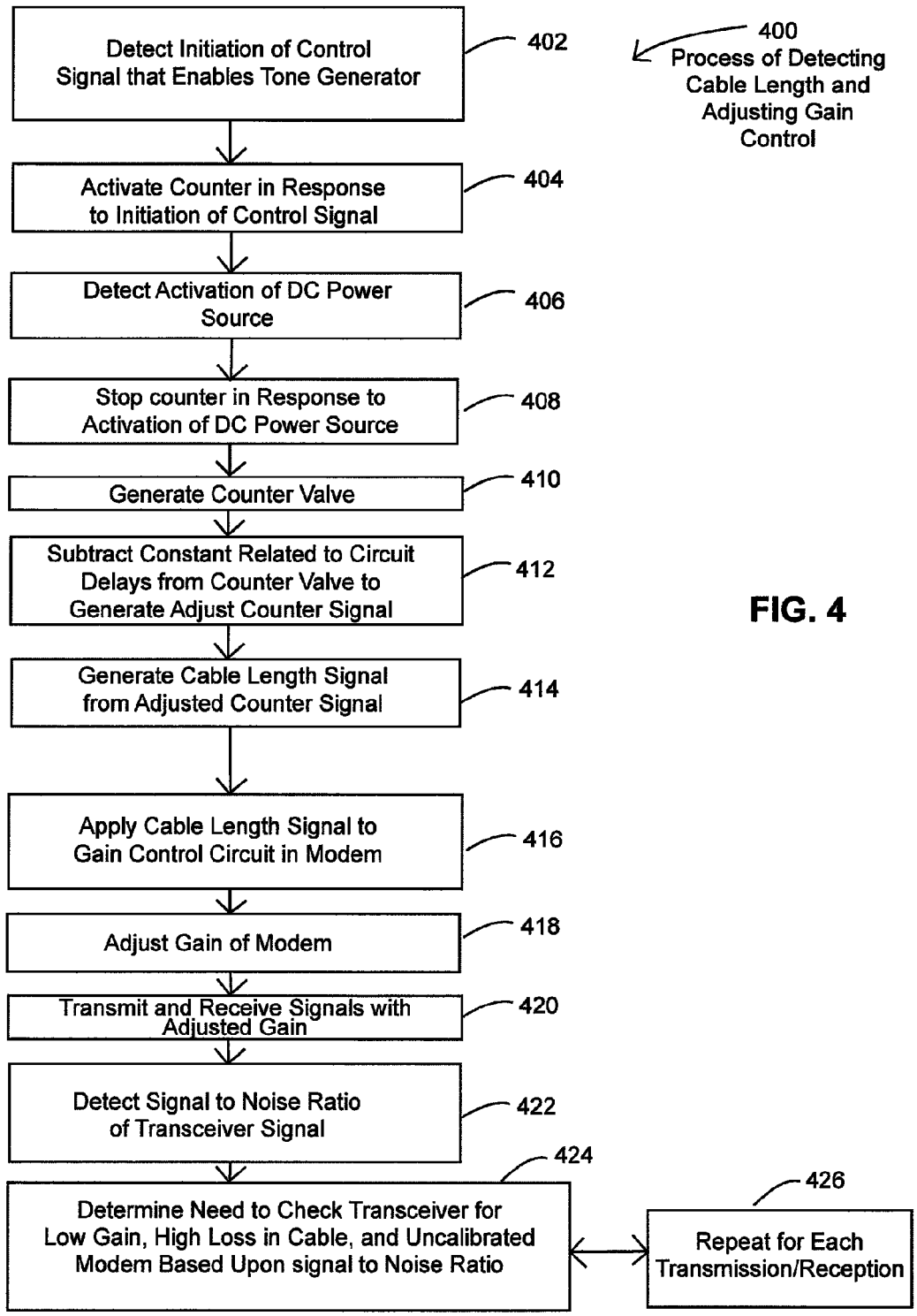
FIG. 4 is a flow diagram illustrating a process for detecting cable length and adjusting gain control.

FIG. 4 is a block diagram of an embodiment of a process for detecting cable length and adjusting gain control in the modem 104. At step 402, the initiation of control signal 302 is detected in the modem that enables the tone generator 304. At step 404, the counter 306 is also activated by the initiation of the control signal 302. In other words, the rising pulse of the control signal 302 activates both the counter 306 and the 10 MHz tone generator 304. At step 406, detector 310 detects the activation of the DC power source 308. As indicated above, the detector 310 can be a detector that detects an increase in the voltage drop across a series wired resistance or other suitable detector devices. For example, digital power supplies generate digital control signals to control the current output. One of these digital control signals can be used to provide a detection signal to detect when the DC power source 308 begins to draw a higher current. Upon detection of current being drawn from the DC power source 308, sample signal 311 is generated that is applied to the sample and hold circuit 328. Sample and hold circuit 328 samples the counter to provide a counter value 315 that is applied to the subtractor circuit 312. Sample and hold circuit 328 also generates a reset signal 330 to reset counter 306.

As shown at step 410 in FIG. 4, the counter value of the counter 306 is then applied to subtractor circuit 312. At step 412, the subtractor circuit 312 subtracts a constant value from the value 315. The counter value 315, that is provided by the sample and hold circuit 328, is a value that is proportional to the length of the connecting cable 106, plus a constant value relating to various circuit delays. The value of that constant, that is subtracted by the subtractor circuit 312, can be determined empirically by taking several measurements of the value of the counter circuit 306 for known lengths of the connecting cable 106. Alternatively, subtractor circuit 312 can be eliminated and empirical values, that are measured for various cable lengths, can be stored in a lookup table. At step 414, a cable length signal is generated from the adjusted counter signal, which is the counter value with the constant value subtracted, or the value provided from a lookup table. At step 416, the cable length signal is applied to the gain control circuit 314 to adjust the gain of modem 104. At step 418, gain control circuit adjusts the gain of the transmitted and received signals. Optionally, a gain control signal 322 can also be generated which is applied to transceiver 108 via connecting cable 106. At step 420, the system detects the signal to noise ratio of the data received over the connecting cable 106. If the signal to noise ratio of the data is too low, it is then determined that the transceiver should be checked for low gain, high loss in the cable, or an uncalibrated modem. Gain control signal 322 can be automatically adjusted to seek an improved signal to noise ratio. At step 426, the process 400 illustrated in FIG. 4 can be repeated for each transmission or reception of data by the modem 104. In this manner, the length of the cable can be measured for each transmission, so that the proper gain is used. For example, if the transceiver 108 is moved after the initial installation, repeating this process each time a tone control signal is generated will ensure that proper gain is used.

Hence, the various embodiments disclose a system and method for determining the length of a connecting cable between a modem and a transceiver circuit and automatically adjusting the gain of the modem and, optionally, the gain of the transceiver, to ensure that the transceiver operates in the proper power range. This process avoids problems created by the manual input of cable lengths by installers that frequently insert incorrect cable lengths.

The foregoing description of the invention has been presented for purposes of illustration and description. It is not intended to be exhaustive or to limit the invention to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments of the invention except insofar as limited by the prior art.

What is claimed is:

1. A method of automatically adjusting the gain of a modem that is connected to a transceiver by a connecting cable in a satellite communication system comprising:

generating a tone control signal in response to a control signal associated with a transmission of a data signal from said transceiver;

transmitting said tone control signal to said transceiver to enable operation of said transceiver for said transmission;

activating, concurrently with generating said tone control signal, a counter in response to said control signal;

applying, at said modem, a voltage from a power supply to said connecting cable to power said transceiver;

sampling a count value from said counter upon detection of an increase in current supplied to said transceiver from said power supply;

generating a cable length signal from said count value, wherein a value of said cable length signal is substantially proportional to a length of said connecting cable;

adjusting gain of said modem based at least in part on said cable length signal.

2. The method of claim 1 further comprising:
generating a transceiver gain control signal in response to said cable length signal;
adjusting gain of said transceiver based upon said gain control signal.

3. The method of claim 1 further comprising:
generating a signal to noise ratio signal for data signals received by said modem;
adjusting gain of said transceiver based upon said signal to noise ratio signal.

4. The method of claim 1, further comprising:
subtracting, from said count value, a constant value corresponding to a circuit delay of said modem.

5. A system for automatically adjusting the gain of a modem in a satellite communication system comprising:
a transceiver;
a connecting cable that is connected between said transceiver and said modem that supplies power to said transceiver from said modem;
said modem comprising:
a tone generator that generates a tone control signal in response to a control signal, said tone control signal transmitted to said transceiver through said connecting cable to enable operation of said transceiver for transmission of a data signal from said transceiver;
a counter that is activated concurrently with said tone control signal in response to said control signal that generates a counter value signal;
a power source that is connected to said connecting cable and that supplies said power to said transceiver;
a detector that detects an increase in current supplied by said power source to said transceiver and generates a sample signal upon detection of said increase in said current supplied by said power source to said transceiver;
a counter value signal generated in response to said sample signal, wherein a value of said counter value signal is substantially proportional to a length of said connecting cable;
a gain control circuit that adjusts gain of said modem based at least in part on said counter value signal.

6. The system of claim 5 wherein said gain control circuit further adjusts gain of said transceiver in response to said counter value signal.

7. The system of claim 5 wherein said gain control circuit further adjusts gain of said transceiver in response to a signal to a noise ratio signal.

8. The system of claim 5, further comprising:
a subtractor that subtracts a constant value corresponding to a circuit delay of said modem from said counter value signal.

\* \* \* \* \*